(12) United States Patent
Lyles, Jr. et al.

(10) Patent No.: US 6,542,861 B1
(45) Date of Patent: Apr. 1, 2003

(54) SIMULATION ENVIRONMENT CACHE MODEL APPARATUS AND METHOD THEREFOR

(75) Inventors: Joseph William Lyles, Jr., Austin, TX (US); Jen-Tien Yen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,618

(22) Filed: Mar. 31, 1999

(51) Int. Cl.[7] .......................... G06F 9/44; G06F 13/10; G06F 13/12

(52) U.S. Cl. .......................... 703/21; 703/22; 711/113; 711/118

(58) Field of Search ................. 703/13–14, 20–25; 711/113, 118–141

(56) References Cited

U.S. PATENT DOCUMENTS

| | | | |
|---|---|---|---|
| 4,317,168 A | * 2/1982 | Messina et al. | 711/143 |
| 5,088,058 A | 2/1992 | Salsburg | 364/500 |
| 5,247,653 A | 9/1993 | Hung | 395/500 |
| 5,452,440 A | 9/1995 | Salsburg | 395/463 |
| 5,737,751 A | 4/1998 | Patel et al. | 711/133 |
| 5,740,353 A | 4/1998 | Kreulen et al. | 395/183.18 |
| 5,802,571 A | * 9/1998 | Konigsburg et al. | 711/143 |
| 5,845,106 A | * 12/1998 | Stapleton | 703/21 |
| 5,940,618 A | * 8/1999 | Blandy et al. | 717/4 |
| 6,059,835 A | * 5/2000 | Bose | 703/19 |
| 6,173,243 B1 | * 1/2001 | Lowe et al. | 703/14 |
| 6,240,490 B1 | * 5/2001 | Lyles, Jr. et al. | 711/141 |

OTHER PUBLICATIONS

Prete et al, "The ChARM Tool for Tuning Embedded Systems", IEEE Micro, vol. 17 Issue 4, pp. 67–76 (Jul.–Aug. 1997).*
Reference to Hong et al, "Design and Performance Evaluation of an Adaptive Cache Coherence Protocol", IEEE Proceedings of the 1998 International Conference on Parallel and Distributed Systems, pp. 33–40 (Dec. 1998).*
Dahlgren, "Boosting the Performance of Hybrid Snooping Cache Protocols", IEEE 22nd Annual International Symposium on Computer Architecture, pp. 60–69 (Jun. 1995).
Grahn, Evaluation of Design Alternatives for a Directory–Based Cache Coherence Protocol in Shared–Memory Multiprocessors Doctoral Thesis, 1995 (text downloaded from pdf link at: http://citeseer.nj.nec.com/grahn95evaluation.html).
"Method for Predicting the Performance of Set–Associative Cache Memories", *IBM Technical Disclosure Bulletin*, vol. 31 No. 8, Jan. 1989, pp. 275–276.

* cited by examiner

*Primary Examiner*—Samuel Broda
(74) *Attorney, Agent, or Firm*—Barry S. Newberger; Winstead Sechrest & Minick P.C.; Robert M. Carwell

(57) ABSTRACT

A cache model apparatus and method are implemented. A set of predetermined protocols for generating cache block movement events driving level one (L1) cache to level two (L2) cache traffic in a simulation environment are provided. An event protocol is selected for a test case in response to user input, or alternatively, a random selection is made. In accordance with the protocol selected, castouts of modified L1 cache lines are generated.

21 Claims, 4 Drawing Sheets

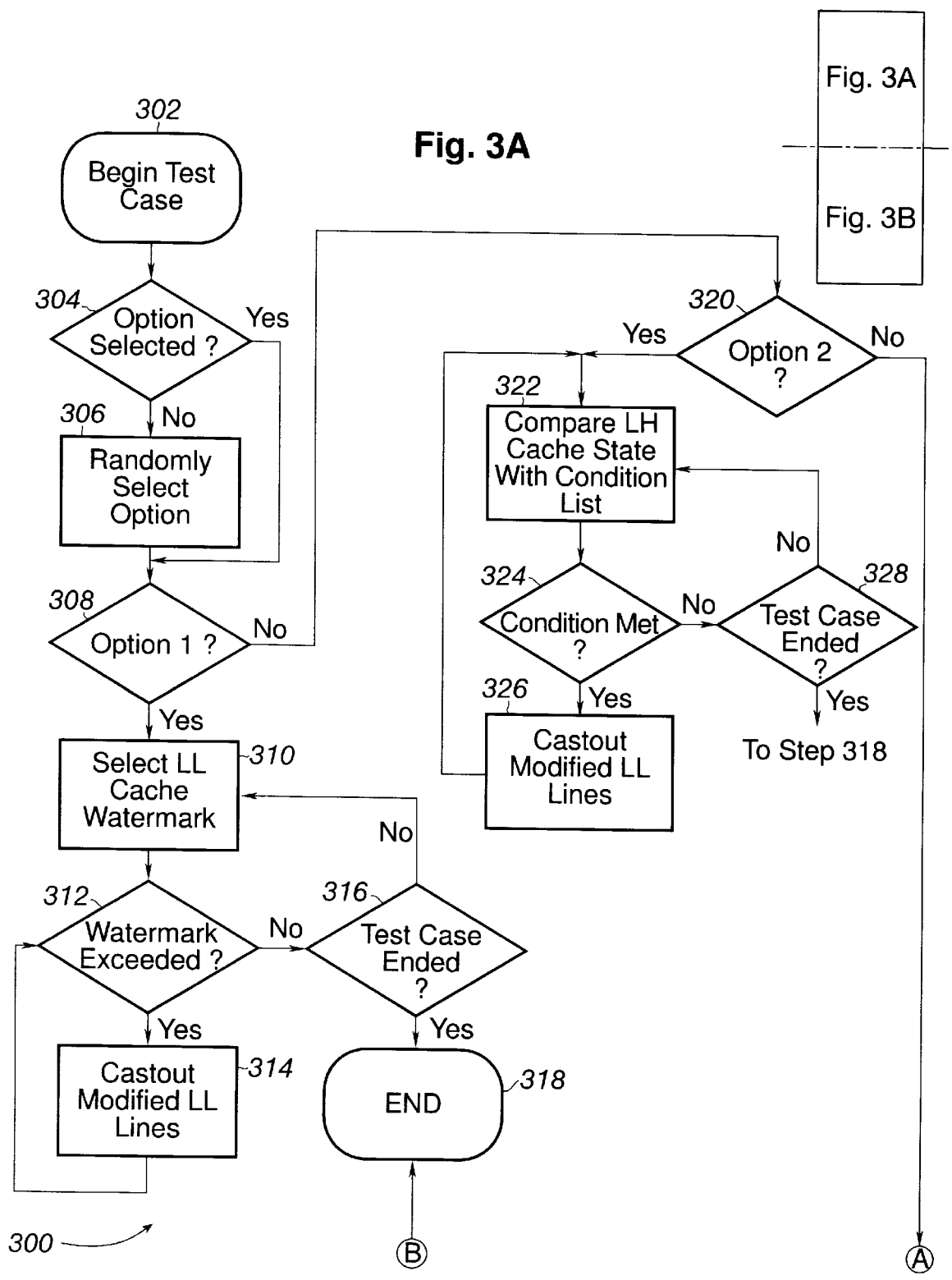

SIMULATION ENVIRONMENT CACHE MODEL APPARATUS AND METHOD THEREFOR

TECHNICAL FIELD

The present invention relates in general to data processing systems, and in particular, to cache event triggering in simulations of processor systems.

BACKGROUND INFORMATION

It is commonplace, in modern data processing systems, to include high speed memory, called caches, to improve the performance of memory transactions. Typically, the central processing unit (CPU) includes an amount of cache memory, which can be accessed by the processor core very quickly. This cache is commonly referred to as the level one (L1). Additional levels of cache, which may be either internal or external to the CPU, may be included between the L1 cache and main memory. A next level of cache is typically referred to as level two (L2) cache, and additional levels may be labeled in similar fashion.

CPU memory transactions cause traffic between the L1 and L2 caches, or more generally between lower level (LL) and higher level (LH) caches in a data processing system including multiple levels of cache memory. For example, a "castout" occurs when there is a cache miss in the L1 cache, and the cache line to be replaced, to make room for the line to be fetched from the L2 cache or main memory, has been modified. Then, the modified cache line is written to, or castout, to the L2 cache. Similarly, a "push" operation occurs if a snoop hit is detected in which the snooped location corresponds to a modified line in the L1 cache. Then, the line is "pushed" to main memory or to the requesting bus device, which may be a second CPU in a multiprocessor system.

In a simulation environment, in order to fully simulate the L2 cache control logic, maximum traffic from the L1 cache to the L2 cache should be generated. Previously, either no cache model (an event generator that emulates any legal function of the cache) for providing maximum traffic was built into the L1 event generator (event generators are typically referred to as "irritators"), or a cache model for providing maximum traffic was implemented in the L1 imitator but encountered difficulties in providing maximum traffic because most of the data was cached in the L1 model, and cache block movement did not occur until a modified cache line was selected for replacement. Thus, in the latter case, L1 to L2 traffic was not generated until induced by the instruction stream in The test case under simulation. Consequently, in both circumstances, there are problems in generating sufficient traffic to ensure that "corner" cases were covered. Corner cases refer to L2 control logic states that occur infrequently. Then, the simulations may fail to uncover cache flaws, or "bugs."

Therefore, there is a need in the art for a mechanism to mitigate against untested corner cases. In particular, there is a need in the art for a cache irritator mechanism to generate traffic rates between cache levels, for example between L1 and L2 caches, sufficient to stress the cache control logic of the LH cache, and to generate critical block movements from the LL cache to the LH cache.

SUMMARY OF THE INVENTION

The aforementioned needs are addressed by the present invention. Accordingly, there is provided, in a first form, a method for cache model simulation. The method includes providing a predetermined set of cache block movement event protocols. An event protocol is selected from the predetermined set, and a castout of lines in a first cache is performed in response to the protocol.

There is also provided, in a second form, a data processing system for cache model simulation. The system contains circuitry operable for providing a predetermined set of cache block movement event protocols. Also included is circuitry operable for selecting an event protocol from the predetermined set, and circuitry operable for performing a castout of lines in a first cache in response to the protocol.

Additionally, there is provided, in a third form, a computer program product operable for storage on a machine readable storage medium, wherein the program product is operable for cache model simulation. The program product has programming for providing a predetermined set of cache block movement event protocols, and programming for selecting an event protocol from the predetermined set. Programming for performing a castout of lines in a first cache in response to the protocol is also included.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
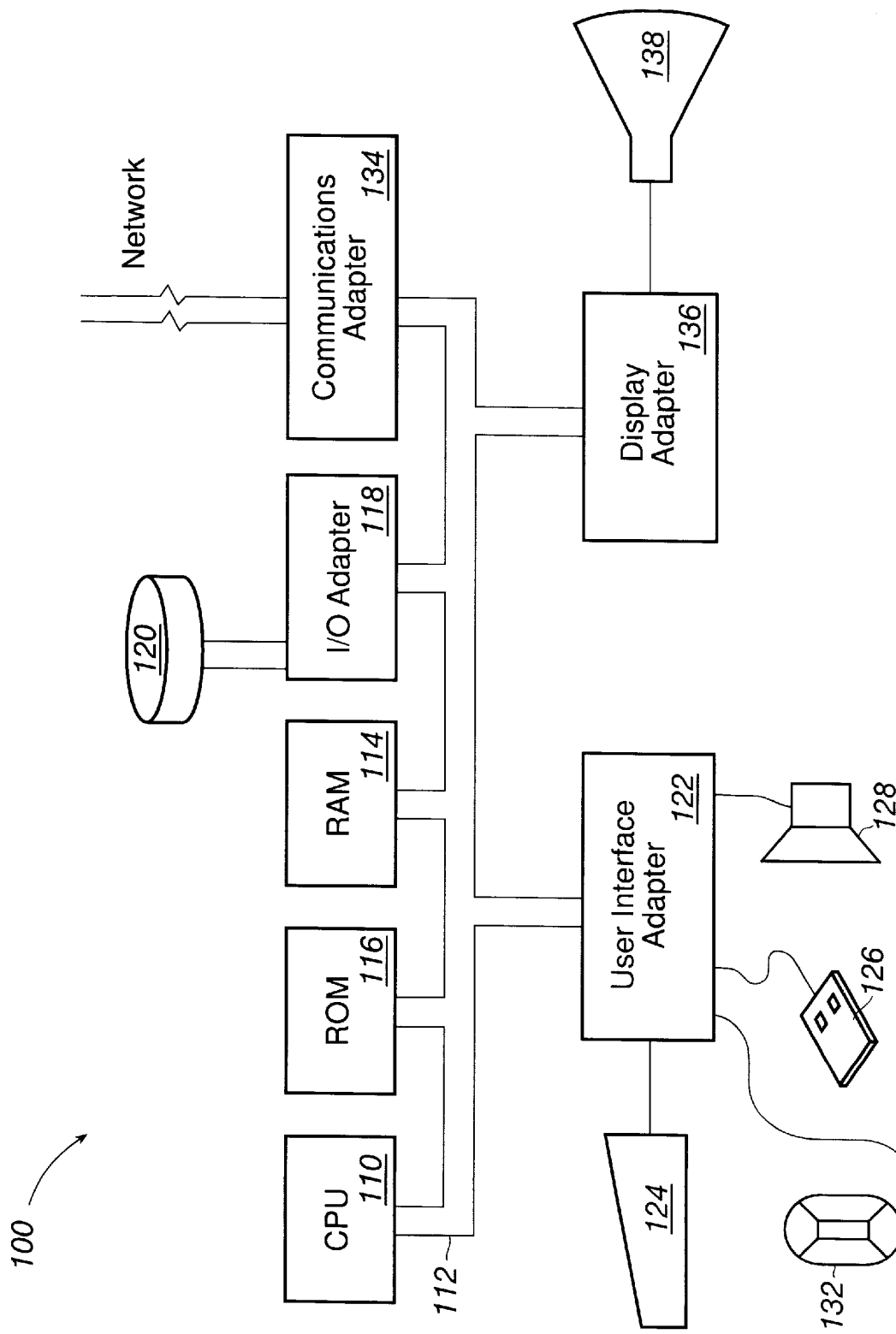
FIG. 1 illustrates, in block diagram form, a data processing system in accordance with an embodiment of the present invention.

The present invention provides a mechanism in a cache irritator for generating cache traffic in the simulation of a data processing system. Block movements from a LL cache, such as an L1 cache, to a LH cache, such as an L2 cache, are generated in accordance with a set of protocols. A protocol from the set may be specified by the user during the simulation. Otherwise, a protocol is randomly selected from the set. Block movements from the LL simulation cache to the LH simulation cache are generated in accordance with the selected protocol.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110, which is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 2:
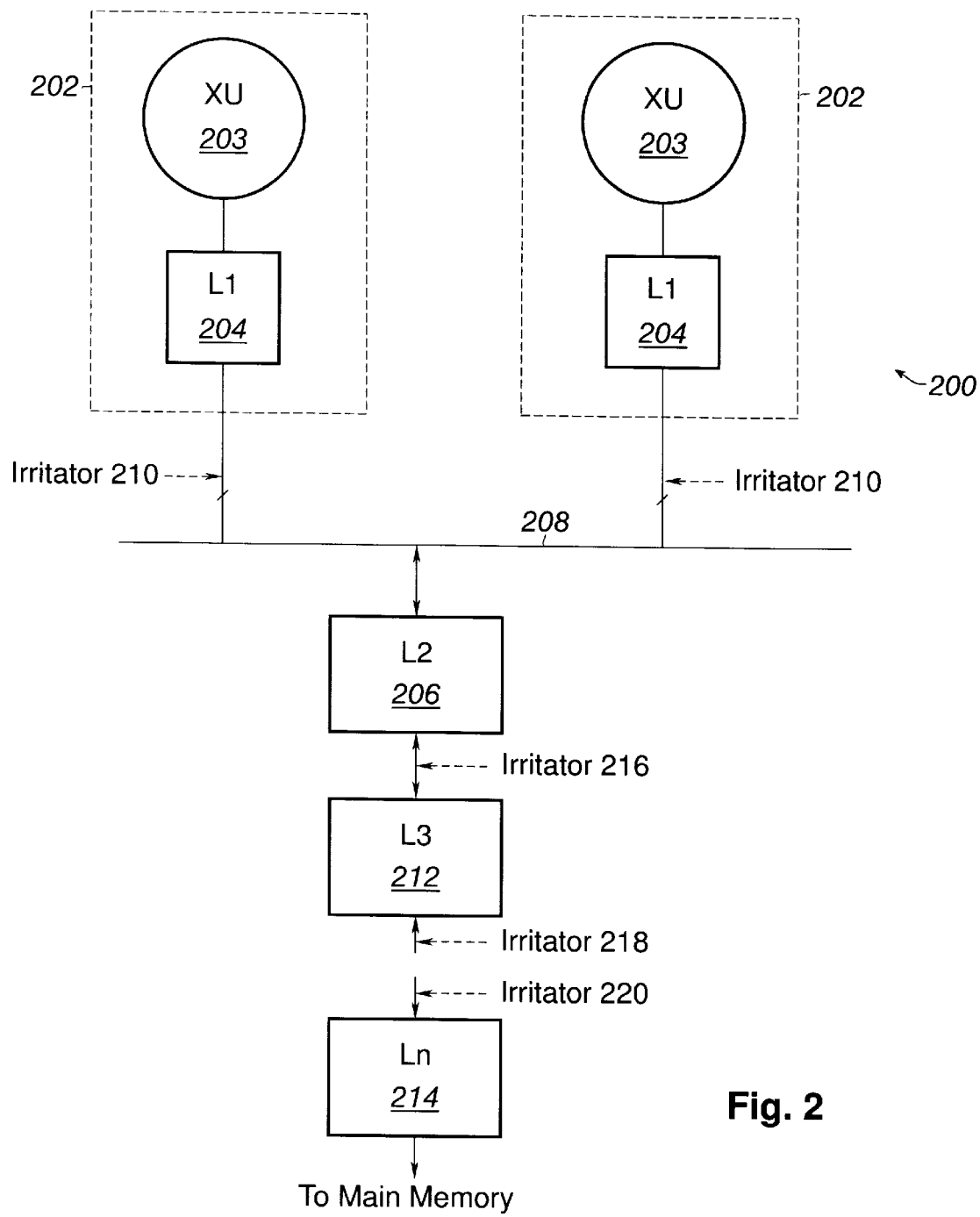
FIG. 2 illustrates an exemplary simulation system in accordance with an embodiment of the present invention.

Refer now to FIG. 2 illustrating a portion 200 of an exemplary simulation system. Portion 200 includes two CPUs 202, wherein the simulation system including portion 200 may be a multiprocessor system. However, it would be understood by an artisan of ordinary skill that the present invention may be used in the simulation of single processor systems. Portion 200 includes L1 caches 204 coupled to a corresponding one of execution unit (XU) 203. Typically, as described hereinabove, the L1 cache is incorporated in the same integrated circuit chip as the corresponding CPU 202, however, it would be understood by an artisan of ordinary skill that the present invention is not restricted to such an embodiment. Each of the L1 caches 204 is coupled to L2 cache 206 via bus 208. A cache irritator 210 corresponding to a respective one of L1 caches 204 drive cache block movement events at an interface between L1 caches 204 and L2 cache 206.

Additionally, portion 200 may include a plurality, n, of cache levels, including level 3 (L3) cache 212 through level n (Ln) cache 214. Irritators in accordance with the present invention, such as, irritators 216–220 may be included to drive events at interfaces between each cache level. Irritators 210 and 216–220 drive events in accordance with a design protocol for the interface. For example, in an embodiment of an interface having a protocol that requires that events be acknowledged, irritators, such as, irritators 210 and 216–220, will not drive a second event if an acknowledgment of a preceding first event is pending.

An embodiment of a simulation environment and an event generation by event generators, or irritators, is described in further derail in co-pending, commonly owned U.S. Patent Application entitled, "Apparatus and Method For Dynamic Simulation Event Triggering," Ser. No. 09/213,913, which is hereby incorporated herein by reference.

Figure 3B:
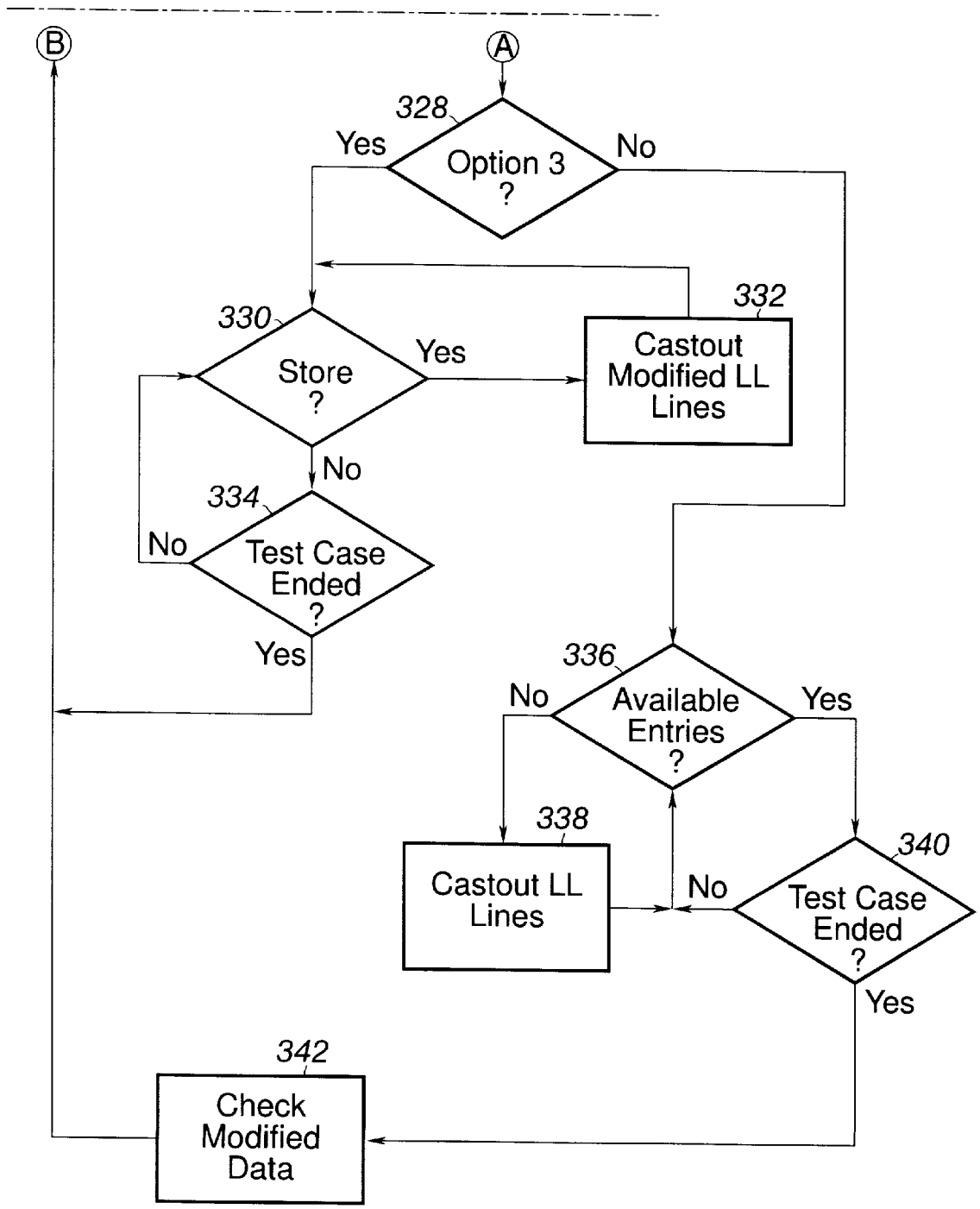
FIG. 3 (including partial views FIG. 3A and FIG. 3B) illustrates, in flow chart form, a cache model methodology in accordance with an embodiment of the present invention.

Refer now to FIG. 3 (including partial views FIG. 3A and FIG. 3B) illustrating, in flow chart form, a methodology 300 to generate cache block movement traffic in a cache irritator. Methodology 300 initiates in step 302 when the test case begins. In step 304, it is determined if a user has selected one of a predetermined set of block movement event protocols. If the user has selected a protocol, methodology 300 proceeds to step 308, otherwise, in step 306 an option is randomly selected.

An option may be randomly selected, in step 306, using known techniques. For example, in an embodiment in which the predetermined set of event protocol options includes a plurality, N members, each of the N members may be associated with one of N equal subintervals of the interval [0,1]. Then, a random number, uniformly distributed in [0,1] may be drawn, using techniques well known in the art. Then, for a random number located in the ith subinterval, the corresponding one of the N options is selected. In such an embodiment, each of the N options is equally likely. It would be understood by an artisan of ordinary skill, however, that other random number distributions would be within the spirit and scope of the present invention. It would be further understood that the options included in the predetermined set of options may not all be equally likely in such embodiments.

After an option has been selected, either in response to a user selection, in step 304, or randomly, in step 306, methodology 300 determines if the first option is selected, in step 308. If, in step 308, the first option has been selected, then in step 310 a LL cache threshold, or "watermark" is selected. The value of the watermark selected in step 310 determines a maximum number of modified cache lines that may be contained in the LL cache. If, during the simulation test case, the number of modified cache lines exceeds the watermark, in step 312, the modified cache lines are castout, step 314. Otherwise, in step 316, it is determined if the test case is concluded. If not, methodology 300 returns to step 312. If, however, it is determined in step 316 that the test case is ended, methodology 300 terminates, step 318.

If, in step 308, the first option has not been selected, then, in step 320 it is determined if a second option has been selected. If it is determined in step 320 that the second option was selected, in step 322, the state of the LH cache is compared with a predetermined list of conditions. The conditions in the list represent states that signal that the LH control logic is busy. For example, the LH control logic may be occupied when the LH cache is doing higher priority tasks in accordance with a predetermined prioritization protocol. Higher priority tasks might include bus snooping or data reloading into the LH cache because of a cache miss in the LH cache. Other conditions might include a full castout queue in the LH control logic, or the control logic may be occupied by castouts generated by other LL caches in a multiprocessor environment. If, one of the predetermined list of conditions is met, step 324, then, in step 326, a castout of the modified LL lines is generated. In this way, the LL irritator facilitates stressing of the LH control logic and makes the logic's task more "interesting" in that the logic is required to handle simultaneous events. For example, a snoop request and multiple reloads may be simultaneously generated, stressing arbitration logic in the LH controller.

If, however, in step 324, one of the preselected conditions has not been met, it is determined in step 328 if the test case has ended. If the test case has ended, methodology 300 proceeds to step 318, and terminates. Otherwise, methodology 300 returns to step 322.

Returning to step 320, if the second option has not been selected, it is determined, in step 328, if a third option has been selected. If the third option has been selected, methodology 300, determines, in step 330 if a store operation has occurred in the test case instruction stream. If so, in step 332, the cache irritator performing methodology 300 issues a store request, and, after the cache line is returned from main memory or LH, modifies the line with the stored data and immediately generates a castout of the modified LL cache lines. Methodology 300 then returns to step 330. If, however, in step 330, a store instruction has not been detected, it is determined in step 334 if the test case has ended. If the test case has ended, in step 334, methodology 300 terminates in step 318. Otherwise, methodology 300 returns to step 330.

Returning to step 328, if the third option has not been selected, then methodology 300, in step 336 determines if there are available entries in the LL cache, in response to an instruction in the test case instruction stream generating a cache miss. If, in step 336, there are no available entries, an irritator performing methodology 300 generates a castout of modified LL cache lines in step 338. If, however, entries are available, in step 336, then in step 340, it is determined if the test case has ended. If so, the modified data is checked in step 342 to ascertain that data has not been dropped, because the LL cache can still contain modified data. Methodology 300 then terminates in step 318. If the test case is not ended, in step 340, methodology 300 returns to step 336, and loops, casting out L1 lines when entries are unavailable, in step 336, until the test case ends in step 340.

In this way, the present invention provides a mechanism for generating L1 cache to L2 cache traffic in a data processing system simulation environment. An L1 cache irritator drives cache block movement events on the L1 cache/L2 cache interface in accordance with a selected L1 cache event protocol. The protocol may be selected by the user from a predetermined set of protocol options. Alternatively, an option may be randomly selected from the predetermined set. Increasing the L1 cached L2 cache traffic better stresses the L2 cache control logic, thereby improving the cover of corner cases.

Although the present invention and its advantages have been described in detail, it should be understood that various changes, substitutions and alterations can be made herein without departing from the spirit and scope of the invention as defined by the appended claims.

What is claimed is:

1. A method for cache model simulation comprising the steps of: providing a predetermined set of cache block movement event protocols, selecting an event protocol from said predetermined set; and performing a castout of line in a first cache in response to a selected event protocol.

2. The method of claim 1 wherein said selecting step comprises the step of determining said protocol in response to user input.

3. The method of claim 1 wherein said selecting step comprises the step of randomly selecting said protocol from said predetermined set.

4. The method of claim 1 wherein said protocol comprises:

selecting a cache threshold; and causing said castout step to occur when a number of modified cache lines exceeds said threshold.

5. The method of claim 1 wherein said protocol comprises:

providing a predetermined list of cache state conditions in a second cache, wherein said castout communicates data to said second cache;

comparing a current state of said second cache with said list of cache state conditions;

causing said castout step to occur when said current state is the same as a cache state in said predetermined list.

6. The method of claim 1 wherein said protocol comprises:

determining if a store command has been executed; and causing said castout step to occur when a store command executes.

7. The method of claim 1 wherein said protocol comprises:

determining if entries are available in said first cache; and causing said castout to occur if no available entries are obtained in response to said determining step.

8. A data processing for cache model simulation comprising:

circuitry operable for providing a predetermined set of cache block movement event protocols;

circuitry operable for selecting an event protocol from said predetermined set, and circuitry operable for performing a castout of lines in a first cache in response to a selected event protocol.

9. The data processing system of claim 8 wherein said circuitry operable for selecting comprises circuitry operable for determining said protocol in response to user input.

10. The data processing system of claim 8 wherein said circuitry operable for selecting comprises circuitry operable for randomly selecting said protocol from said predetermined set.

11. The data processing system of claim 8 wherein said protocol comprises:

circuitry operable for selecting a c ache threshold; and circuitry operable for causing said castout to occur when a number of modified cache lines exceeds said threshold.

12. The data processing system of claim 8 wherein said protocol comprises:
 a memory device including a predetermined list of cache state conditions in a second cache, wherein said castout communicates data to said second cache;
 circuitry operable for comparing a current state of said second cache with said list of cache state conditions;
 circuitry operable for causing said castout to occur when said current state is the same as a cache state in said predetermined list.

13. The data processing system of claim 8 wherein said protocol comprises:
 circuitry operable for determining if a store command has been executed; and
 circuitry operable for causing said castout to occur when a store command executes.

14. The data processing system of claim 8 wherein said protocol comprises:
 circuitry operable for determining if entries are available in said first cache; and
 circuitry operable for causing said castout to occur if no available entries are obtained in response to said determining step.

15. A computer program product operable for storage on a machine readable storage medium, the program product operable for cache model simulation comprising:
 programming for providing a predetermined set of cache block movement event protocols;
 programming for selecting an event protocol form said predetermined set; and
 programming for performing a castout of lines in a first cache in response to a selected event protocol.

16. The program product of claim 15 wherein said programming for selecting comprises programming for determining said protocol in response to user input.

17. The program product of claim 15 wherein said programming for selecting comprises circuitry operable for randomly selecting said protocol from said predetermined set.

18. The program product of claim 15 wherein said protocol comprises:
 programming for selecting a cache threshold; and
 programming for causing said castout to occur when a number of modified cache lines exceeds said threshold.

19. The program product of claim 15 wherein said protocol comprises:
 programming for a predetermined list of cache state conditions in a second cache, wherein said castout communicates data to said second cache;
 programming for comparing a current state of said second cache with said list of cache state conditions;
 programming for causing said castout to occur when said current state is the same as a cache state in said predetermined list.

20. The program product of claim 15 wherein said protocol comprises:
 programming for determining if a store command has been executed; and
 programming for causing said castout to occur when a store command executes.

21. The program product of claim 15 wherein said protocol comprises:
 programming for determining if entries are available in said first cache; and
 programming for causing said castout to occur if no available entries are obtained in response to said determining step.

* * * * *

UNITED STATES PATENT AND TRADEMARK OFFICE
CERTIFICATE OF CORRECTION

PATENT NO.  : 6,542,861 B1                                        Page 1 of 1
DATED       : April 1, 2003
INVENTOR(S) : Joseph William Lyles, Jr. and Jen-Tien Yen It is certified that error appears in the above-identified patent and that said Letters Patent is hereby corrected as shown below:

Column 1,
Line 57, please replace "comer" with -- corner --.

Column 4,
Line 21, please delete the paragraph space following "pending".

Column 6,
Line 11, please replace "," with -- ; --.
Line 12, please replace "line" with -- lines --.
Line 49, please replace "," with -- ; --.
Line 61, please replace "c ache" with -- cache --.

Column 7,
Line 29, please replace "form" with -- from --.

Signed and Sealed this

Seventh Day of October, 2003

JAMES E. ROGAN
*Director of the United States Patent and Trademark Office*